March 25, 1941.   J. H. ENGEL   2,236,090
ADJUSTABLE GILL FOR AIRCRAFT ENGINE COWL
Filed Dec. 13, 1937
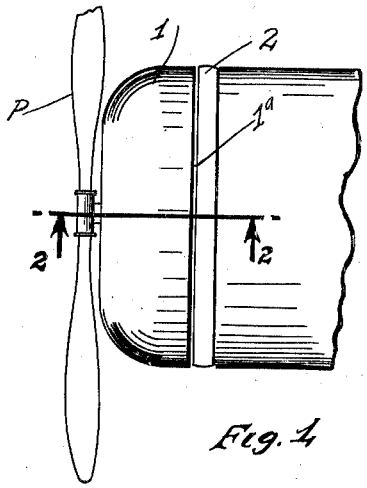
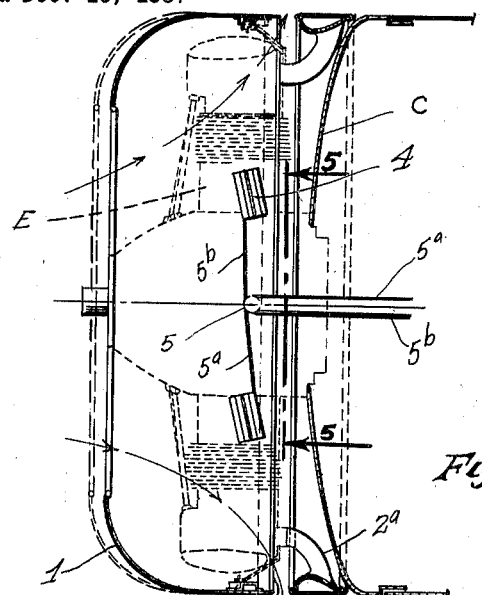
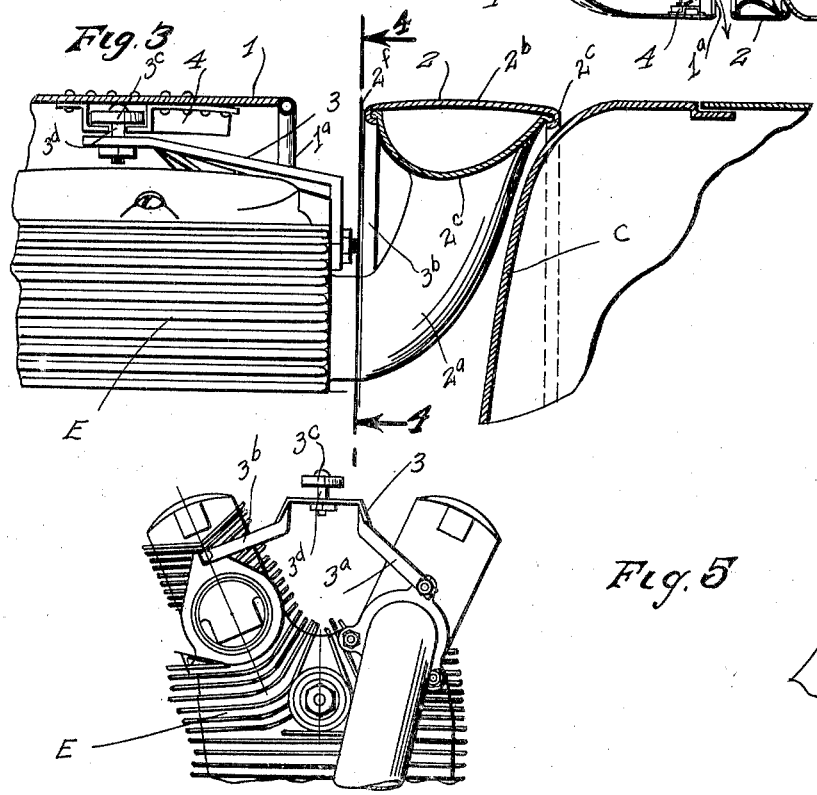
INVENTOR.
John H. Engel
BY A. B. Bowman
ATTORNEY.

Patented Mar. 25, 1941

2,236,090

UNITED STATES PATENT OFFICE 2,236,090

ADJUSTABLE GILL FOR AIRCRAFT ENGINE COWL

John H. Engel, Escondido, Calif.

Application December 13, 1937, Serial No. 179,539

6 Claims. (Cl. 123—171)

My invention relates to an adjustable gill for aircraft engine cowl, and the objects of my invention are:

First, to provide an adjustable gill for aircraft engine cowl;

Second, to provide a gill for aircraft engine cowl which may be adjusted to control the cooling of aircraft engine.

Third, to provide a gill for aircraft engine cowl, the aperture of which gill may be varied; and Fourth, to provide a novel adjustable gill for aircraft engine cowl which is simple of construction and durable, all in proportion to its function, efficient in its function, and which will not readily deteriorate or otherwise get out of order.

With these and other objects in view as will appear hereinafter, my invention consists of certain novel features of construction, combination, and arrangement of parts and portions as will be hereinafter described in detail and particularly set forth in the appended claims, reference being had to the accompanying drawing and to the characters of reference thereon which form a part of this application in which:

Figure 1 is a fragmentary elevational view of the forward end of the fuselage of an airplane; Fig. 2 is a fragmentary sectional view taken along the line 2—2 of Fig. 1 and is on an enlarged scale over the Fig. 1; Fig. 3 is a fragmentary sectional view similar to Fig. 2 on a further enlarged scale over the Fig. 2; Fig. 4 is a fragmentary sectional view taken along the line 4—4 of Fig. 3 with certain parts omitted to facilitate the illustration; and Fig. 5 is a fragmentary sectional view taken along line 5—5 of Fig. 2.

Similar characters of reference refer to similar parts and portions throughout the several views of the drawing:

The shiftable cowling 1, exhaust collector ring 2, bracket support for shiftable cowling 3, guide 4, and sheave bracket 5 constitute the principal parts and portion of my adjustable gill for aircraft engine cowl.

In Figs. 1 and 2 of the drawing, the shiftable cowling 1 is shown positioned at the forward end of the aircraft fuselage. In Fig. 2 of the drawing, the aircraft engine, designated by the letter E is shown in broken outline positioned within the cowling 1. Behind the rearward edge 1a of this shiftable cowling 1 and immediately before the cowling C of the aircraft fuselage is positioned the exhaust collector ring 2. This collector ring 2 is secured to the engine E and communicates with each cylinder thereof by means of the manifold ports 2a. This collector ring 2 is substantially annular shaped, and its cross section is as indicated best in Figs. 2 and 3 of the drawing. This collector ring 2 is made of two parts; the outside course 2b of the ring 2 and the inside course 2c. The manifold ports 2a connect with the inside course 2c. These two courses 2b and 2c are secured together at their edges 2e and 2f as indicated best in Fig. 3 of the drawing and are made of thin sheets of metal which have been formed into the shapes shown for them in Figs. 2 and 3 of the drawing. This collector ring thus is made of flexible material which will not be affected by the vibration of the aircraft engine. It should be noted that the outside course 2b of this collector ring 2 is substantially flush with the outside surface of the fuselage and the outside surface of the cowling 1, thus forming a continuous surface. The cowling 1 is shiftably supported upon a plurality of brackets 3. In Fig. 4 of the drawing, one of these brackets 3 is shown secured to the head of a cylinder of the engine E, one arm 3a of the bracket 3 being secured to the intake port of the cylinder, and the other arm 3b being secured to the exhaust port of the cylinder. This bracket extends forwardly from these ports over the head of the cylinder as shown best in Fig. 3 of the drawing, and supports the small wheel 3c which is positioned within the guide 4. This wheel 3c is pivotally secured upon the bracket 3 by means of the pin 3d, and this wheel 3c will roll within the guides 4 as the cowling 1 is shifted. There will be one guide member 4 for each bracket 3, and the wheel 3c of each bracket 3 will be positioned within its respective guide member 4 as indicated best in Fig. 3 of the drawing. These guides 4 are secured to the inside surface of the shiftable cowling 1 near its rearward edge 1a as indicated best in Fig. 2 of the drawing. It should be noted that each of these guide members 4 is secured to the inside of the cowling 1 so that each guide member stands at a sharp angle with respect to the rearward edge 1a of the cowling 1. This is indicated best in Fig. 2 of the drawing. The sheave bracket 5 is provided with a pair of sheaves 5c and 5d. This sheave bracket 5 is positioned with respect to the cowling 1 as is indicated best in Figs. 2 and 5 of the drawing, and is secured to the engine E. The cable 5b is positioned over the sheave 5c and connects with one of the guide members 4 as indicated best in Figs. 2 and 5 of the drawing, and a cable 5a is positioned over the sheave 5d and connects with another guide member 4 as indicated in Figs. 2 and 5 of the drawing. These cables 5a and 5b extend backwardly within the fuselage of the plane to the operator's compartment. Because the sheaves 5c and 5d are secured near one side of the cowling 1 as indicated best in Fig. 5 of the drawing, when the cable 5a is pulled, the cowling 1 will rotate in one direction. If the cable 5b is pulled, the cowling 1 will rotate in the opposite direction. As the cowling 1 is rotated in a direction depending upon which of the cables 5a or 5b is pulled, said cowling 1 will shift forwardly or rearwardly respectively with respect to the engine E because the guides 4 are set at an angle with the rearward edge 1a of the cowling 1. In Fig. 2 of the drawing, this cowling 1 is shown by solid outline in its extreme rearmost position. It should be noted that when in this position there is an annular space between the rearward edge 1a of the cowling 1 and the edge 2f of the exhaust collector ring 2. By pulling on the cable 5b this cowling 1 may be shifted to its forward position as indicated by the broken outline in Fig. 2 of the drawing. When this happens the rearward edge 1a of the cowling 1 will shift away from the edge 2f of the collector ring 2, thus increasing the size of the annular gap or space between these two edges.

The engine E as shown in the drawing is of the radial air cooled type.

The mode of operation for this adjustable gill for aircraft engine cowl is as follows:

Cooling of the engine E is produced by air flowing in a direction as indicated by arrows in Fig. 2 of the drawing out through the annular space between the rearward edge 1a of the cowl 1 and the forward edge 2f of the exhaust collector ring 2. The rate of flow of air past the engine E may be controlled by either increasing or decreasing the size of this annular space between the rearward edge 1a of the cowl 1 and the forward edge 2f of the collector ring 2. To increase the size of this annular space, the cowling 1 must be shifted forwardly, and this is accomplished by pulling on the cable 5b, thus causing the cowling 1 to rotate and also to shift forward. To decrease the size of this space between the rearward edge 1a of the cowling 1 and the forward edge 2f of the collector ring 2, it is necessary to pull on the cable 5a, thus causing the cowling 1 to shift backwardly with respect to the engine E. The cowling C, across the forward end of the fuselage of the aircraft, serves as a partition to direct the air up and out through the annular space between the rearward edge 1a of the cowling 1 and the forward edge 2f of the collector ring 2.

Though I have shown and described a particular construction, combination, and arrangement of parts and portions, I do not wish to be limited to this particular construction, combination, and arrangement but desire to include in the scope of my invention, the construction, combination, and arrangement substantially as set forth in the appended claims.

Having thus described my invention, what I claim as new and desire to secure by Letters Patent is:

1. In an adjustable gill for aircraft engine cowl on the class described, the combination of a cowling, an exhaust collector ring for said aircraft engine rigidly secured forwardly of said cowling and back of said engine and outwardly thereof, and an engine cowl substantially coextensive in diameter with said exhaust collector ring positioned with its rear side in spaced relation with the front side of said exhaust collector ring and provided with a constant area opening in its front side and shiftably mounted forwardly and backwardly over said engine and relatively to said exhaust collector ring.

2. In an adjustable gill for aircraft engine cowl of the class described, the combination of a cowling, an exhaust collector ring for said aircraft engine rigidly secured forwardly of said cowling and back of said engine and outwardly thereof, an engine cowl substantially coextensive in diameter with said exhaust collector ring positioned with its rear side in spaced relation with the front side of said exhaust collector ring and provided with a constant area opening in its front side and shiftably mounted forwardly and backwardly over said engine and relatively to said exhaust collector ring, and means supported on said engines in cooperative relation with said engine cowl for shifting said cowl forwardly and backwardly and holding said cowl in variable spaced relation with the front side edge of said exhaust collector ring.

3. In an adjustable gill for aircraft engine cowl of the class described, the combination of a cowling, an exhaust collector ring for said aircraft engine rigidly secured forwardly of said cowling and back of said engine and outwardly thereof, an engine cowl substantially coextensive in diameter with said exhaust collector ring positioned with its rear side in spaced relation with the front side of said exhaust collector ring and provided with a constant area opening in its front side and shiftably mounted forwardly and backwardly over said engine and relatively to said exhaust collector ring, means supported on said engines in cooperative relation with said engine cowl for shifting said cowl forwardly and backwardly and holding said cowl in variable spaced relation with the front side edge of said exhaust collector ring, said shifting means including a plurality of guide members secured to the inside surface of said engine cowl near its rearward edge, each one of said guide members positioned at the same angle with respect to the rearward edge of said cowl and a plurality of bracket support members with a wheel thereon engaging said guide members.

4. In an adjustable gill for aircraft engine cowl of the class described, the combination of a cowling, an exhaust collector ring for said aircraft engine rigidly secured forwardly of said cowling and back of said engine and outwardly thereof, an engine cowl substantially coextensive in diameter with said exhaust collector ring positioned with its rear side in spaced relation with the front side of said exhaust collector ring and provided with a constant area opening in its front side and shiftably mounted forwardly and backwardly over said engine and relatively to said exhaust collector ring, means supported on said engine in cooperative relation with said engine cowl for shifting said cowl forwardly and backwardly and holding said cowl in variable spaced relation with the front side edge of said exhaust collector ring, said shifting means including a plurality of guide members secured to the inside surface of said engine cowl near its rearward edge, each one of said guide members positioned at the same angle with respect to the rearward edge of said cowl, a plurality of bracket support members with a wheel thereon engaging said guide members, and a means to shift said cowl revoluble upon its bracket support members.

5. In an adjustable gill for aircraft engine cowls of the class described, the combination of an exhaust collector ring for said aircraft engine rigidly positioned with respect to said engine, an engine cowl positioned with its trailing edge spaced forwardly of said exhaust collector ring and shiftable backwardly and forwardly over said engine for varying the space between the rear edge of said engine cowl and said exhaust collector ring and means for closing the space between said collector ring and said engine, said engine cowl provided with a constant area opening at the middle of its front side whereby air passes into said constant area opening and outwardly between the varying space between said cowl and said exhaust collector ring.

6. In an adjustable gill for aircraft engine cowls of the class described, the combination of an exhaust collector ring for said aircraft engine rigidly positioned with respect to said engine, an engine cowl positioned with its trailing edge spaced forwardly of said exhaust collector ring and shiftable backwardly and forwardly over said engine for varying the space between the rear edge of said engine cowl and said exhaust collector ring and means for closing the space between said collector ring and said engine, said engine cowl provided with a constant area opening at the middle of its front side whereby air passes into said constant area opening and outwardly between the varying space between said cowl and said exhaust collector ring, and means for supporting said cowl in backward and forward shiftable relation on said engine.

JOHN H. ENGEL.